United States Patent [19]

Dahlgren

[11] 3,855,383
[45] Dec. 17, 1974

[54] SEALING LOCK WASHER AND METHOD OF MANUFACTURING

[76] Inventor: John Victor Stanley Dahlgren, c/o Essdee Products, 98 Ocean Blvd., Atlantic Highlands, N.J. 07716

[22] Filed: Apr. 24, 1972

[21] Appl. No.: 246,568

[52] U.S. Cl................. 264/230, 10/86 B, 29/447, 151/35, 264/249
[51] Int. Cl... B21d 53/22, B29c 13/00, F16b 39/24
[58] Field of Search....... 151/35, 38; 85/1 JP, 50 R; 264/230, 249; 29/447; 10/86 B, 73

[56] References Cited
UNITED STATES PATENTS

| 1,592,525 | 7/1926 | Hosking | 151/35 |
|---|---|---|---|
| 1,998,356 | 4/1935 | Brown | 264/230 X |
| 2,223,017 | 11/1940 | Abrams et al. | 264/230 X |
| 2,236,235 | 3/1941 | Head | 151/35 X |
| 3,313,017 | 4/1967 | Zingali | 29/447 X |
| 3,560,128 | 2/1971 | Carlton | 29/447 X |
| 3,619,478 | 11/1971 | Staiger | 264/230 X |

FOREIGN PATENTS OR APPLICATIONS 1,178,075   12/1958   France............................ 151/35

Primary Examiner—Ramon S. Britts

[57] ABSTRACT

The disclosure relates to a radial tooth lock washer, with either internal or external teeth, which is arranged for sealing relationship with a screw head or nut and an underlying surface. The sealing facility takes the form of a short section of heat-shrinkable, usually thermoplastic tubing positioned concentrically about the lock washer and heat shrunk so that portions of the tubing lie over the upper and lower principal surfaces of the lock washer. When the screw is tightened down on the lock washer, the heat-shrunk sealing material serves as an effective annular seal surrounding the threaded portion of the screw and the threaded opening in which it is received. In the case of washers with internal radial teeth, the annular seal is effective to fully enclose the lock washer itself. In the case of a washer with external teeth, the dimensions of the heat shrunk tubing are such that portions thereof extend inward beyond the annular region of the teeth to form a positive seal around the screw shank. In addition, an extremely efficient, although perhaps less positive, seal is provided in the area of the lock washer teeth themselves.

The invention is also directed in part to a novel method and means for assembling the new self-sealing lock washer, whereby the washers may be produced on a high speed, fully automated basis and at an economically realistic cost level.

3 Claims, 14 Drawing Figures

SEALING LOCK WASHER AND METHOD OF MANUFACTURING

BACKGROUND AND SUMMARY OF THE INVENTION

Radial tooth lock washers are in widespread use because of their efficiency and low cost. In certain applications, however, it is desirable to provide an effective liquid seal in relation to the lock washer and/or the screw and parts with which it is associated. In some cases, the seal is desirable to prevent leakage of fluids either into or out of the opening in which the screw is received. In other cases, it is desirable to prevent any access of liquid or moisture to the region of the lock washer because of the susceptibility of such region to rusting because of penetration of protective coatings by the lock washer teeth.

The need for self-sealing lock washers has been long recognized, and a number of proposals have been made for achieving this end. Most of the prior proposals, while possibly effective for the purpose of achieving the desired seal, have never achieved any realistic commercial success because the extra costs of manufacturing require the product to be sold at too high a price premium to be attractive. At the present time, the principal commercial form of self-sealing, radial tooth lock washer is that which is reflected in general by the Head U.S. Pat. No. 2,236,235. However, the device of the Head patent is less than satisfactory in many respects, including reliability and cost increment.

In accordance with the present invention, a unique self-sealing radial tooth lock washer is provided by applying over the washer a short section of heat-shrinkable tubing and, with the tubing properly positioned, causing it to be heat shrunk over the outside of the washer, so that shrunken portions of the tubing overlie the principal flat surface of the lock washer. An extremely effective sealing facility is thus provided. Perhaps more importantly, the techniques of manufacture are such as to accommodate high speed, mass production techniques, whereby the washers may be produced in large volume and at a cost increment which is acceptable to the trade. In this respect, the manufacturing cost increment involved in the application of the heat shrunk sealing element to an otherwise conventional radial tooth lock washer is such that the washers typically may be marketed with a selling price premium of $5.00 or less per 1,000 units.

The principles of the invention are applicable to the production of sealing lock washers of both the internal and external tooth configuration, counter sunk in flat. Moreover, in some instances it is desirable to manufacture screws and nuts with so called "captive" lock washers, which are assembled during the manufacturing process and retained with the screw or nut by a rolled-in thread, lip, or the like. The new self-sealing lock washer of the invention readily accommodates itself to the production of screws and nuts with such "captive" lock washers.

For a better understanding of the above and other advantageous features of the invention, reference should be made to the following detailed description of the invention and to the accompanying drawings.

DESCRIPTION OF PREFERRED EMBODIMENT

Referring now to the drawings, and initially to FIGS. 1 – 6 thereof, the reference numeral 10 (FIG. 1) designates a conventional internal radial tooth lock washer. The lock washer 10 is of flat sheet metal, suitably hardened, and typically stamped in annular form. As reflected in FIG. 4, the internal tooth washer includes a plurality of radially inwardly directed locking teeth 11 arranged about the inner edge of the annulus. These teeth 11 are, in accordance with conventional practice, twisted out of the principal plane of the washer body, to provide sharp edges 12, 13 exposed above and below the plane of the washer. The direction of the twist is such that relative movement between the washer and a screw head or nut in a tightening (clockwise) direction is readily accommodated, while the sharp edges 12 and 13 tend to dig into the opposed surfaces of the screw head or nut and the underlying surface to oppose loosening or anticlockwise movement.

Figure 1:
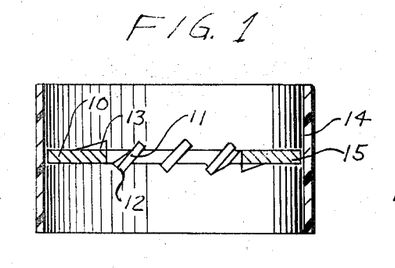
FIG. 1 is a cross sectional view of a typical internal radial tooth lock washer, with a short section of heat shrinkable tubing positioned concentrically thereover, in position to be brought into heat-shrunken assembled position.
Figure 2:
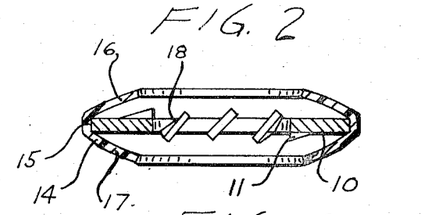
FIG. 2 is a cross sectional view of the lock washer of FIG. 1 with the sealing material heat-shrunk over the outer peripheral portions thereof.
Figure 4:
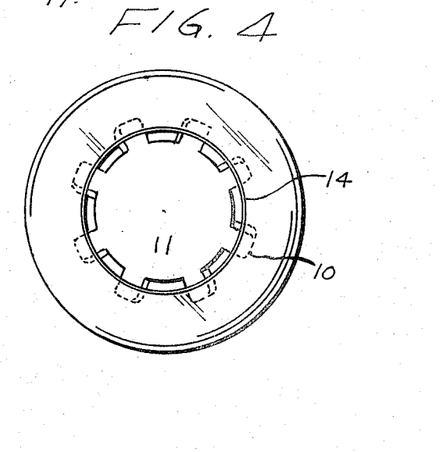
FIG. 4 is a plan view of the self-sealing lock washer of FIG. 2.
Figure 5:
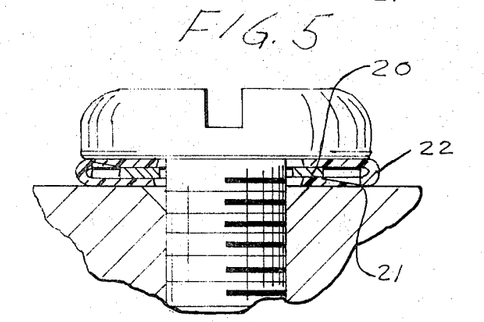
FIG. 5 is a cross sectional view illustrating the manner in which the self-sealing lock washer of FIG. 3 is utilized to provide a seal under a screw head.

In accordance with the present invention, the washer of FIGS. 1, 2 and 4 is provided with a sealing element in the form of a short section of heat shrinkable tubing 14, which is applied over the outer periphery 15 of the washer and heat shrunk tightly about the outer edges of the washer. As reflected in FIG. 1, the sealing element, initially in tubular form, is positioned concentrically over the washer, such that the plane of the washer is transverse to the axis of the tube and is located substantially midway between the ends of the tube. With the parts thus oriented, heat is applied to the heat shrinkable tubing 14, causing it to shrink down toward its stabilized diameter. The central portions of the tubing are, of course, restricted from significant shrinkage by the presence of the washer while end portions 16, 17 of the tube are free to continue to contract inwardly over the upper and lower surfaces of the washer. After the heat-shrinking operation, the sealing element 14 is locked in position, with the portions 16, 17 thereof positioned over the principal flat surfaces of the washer to provide annular sealing areas about the outer peripheral portions of the washer.

While a wide variety of materials may be utilized for the sealing element 14, the hardness and wall thickness of the material is advantageously controlled. The hardness or durometer for ordinary applications should be under 90 Durometer (Shore A-instantaneous) although in some cases the sealing material may be harder than 90 Durometer. The wall thickness of the tubing should also be controlled to at least slightly exceed the projection height of the twisted lock washer teeth 11 above or below the principal flat surfaces of the washer 10. This assures that there is at least minimum sealing contact with the sealing element 14 at any time that the teeth 11 are in effective contact with surfaces of the screw or nut.

A number of heat-shrinkable thermoplastic materials are well suited for use as sealing elements 14; among these are polyvinyl chloride, Teflon-FEP, irradiated polyolefins, and the like. In addition, certain non-thermoplastic, heat-shrinkable polymers may be used to advantage; among these is heat-shrinkable neoprene, for example.

Desirably, the sealing element 14 in its initial form has a ratio of expanded diameter-to-recovered diameter on the order of at least about 2 to 1. In other words, if the tubing were heated and unrestrained, its recovered diameter would be approximately one-half its initial or expanded diameter. This assures that the sealing element will be tightly shrunk over the edges of the washer and that the free ends 16, 17 of the tubing will properly overlie the principal surfaces of the washer.

The axial length of the tubing section, which ultimately forms the sealing element, is determined by the diameter of the washer and the width of its surface. Desirably, the free end portions 16, 17 of the sealing element, in the shrunken condition, extend completely over the flat portions of the washer surface.

Figure 3:
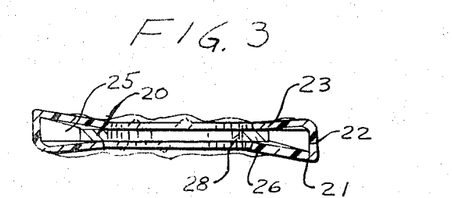
FIG. 3 is a cross sectional view, similar to FIG. 2, illustrating the invention as applied to an external tooth lock washer.

In FIG. 3 there is illustrated a radial tooth lock washer 20, on which the locking teeth 21 are formed externally. That is, they project radially outward, around the outer periphery of the washer body. A sealing element 22 is applied over the washer 20 in the same manner as with the internal tooth washer of FIGS. 1, 2 and 4. In the case of the external tooth washer, however, the axial length of the expanded tubing is such that in the heat-shrunk condition, the free end portions 23, 24 of the tubing extend inwardly beyond the root portions 25 of the locking teeth 21. Thus, at least some portion of the flat surface area 26 of the washer, lying radially inward of the locking teeth 21, will be covered by portions 23, 24 of the sealing element.

Figure 6:
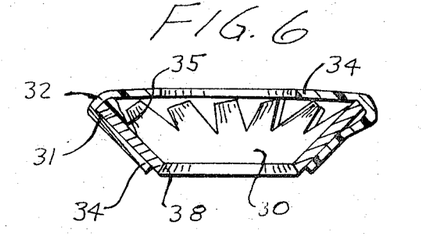
FIG. 6 is a cross sectional view, similar to FIGS. 2 and 3, illustrating the invention as applied to a counter sunk external tooth lock washer.

In FIG. 6 there is illustrated a counter sunk style of lock washer 30, having external radial teeth 31. A sealing element 32 is applied over the washer 30 in the same manner as with the washers of FIGS. 1 and 3, with the axial length of expanded tubing being such that the end portions 33, 34 thereof ultimately overlie the smooth surface portions of the washer located radially inward of the root area 35 of the locking teeth. Initially, the upper free end portion 34 of the tubing tends to be stretched more or less straight across the concave face of the counter sunk washer. However, there is ample flexibility and resilience in the material of sealing element 32 to accommodate its being pressed tightly against the washer surface when a screw is positioned therein and tightened.

As will be observed in FIGS. 1–6, the initial axial length of the tubing sections 14, 22, 32 forming the various illustrated sealing elements, is such that, in the heat-shrunk condition, the end extremities of the sealing element do not extend into the center opnings 18, 28, 38 of the washers. Normally, and desirably, the tubing sections will not be appreciably heat-shrinkable in the axial direction, but only in a radial direction. In some cases, the radial shrinkage would be accompanied by a slight axial elongation. However, the invention does not necessarily preclude the use of biaxially shrinkable tubing, as long as adequate compensation is made for length shrinkage when initially cutting the tubing section to length.

Figure 7:
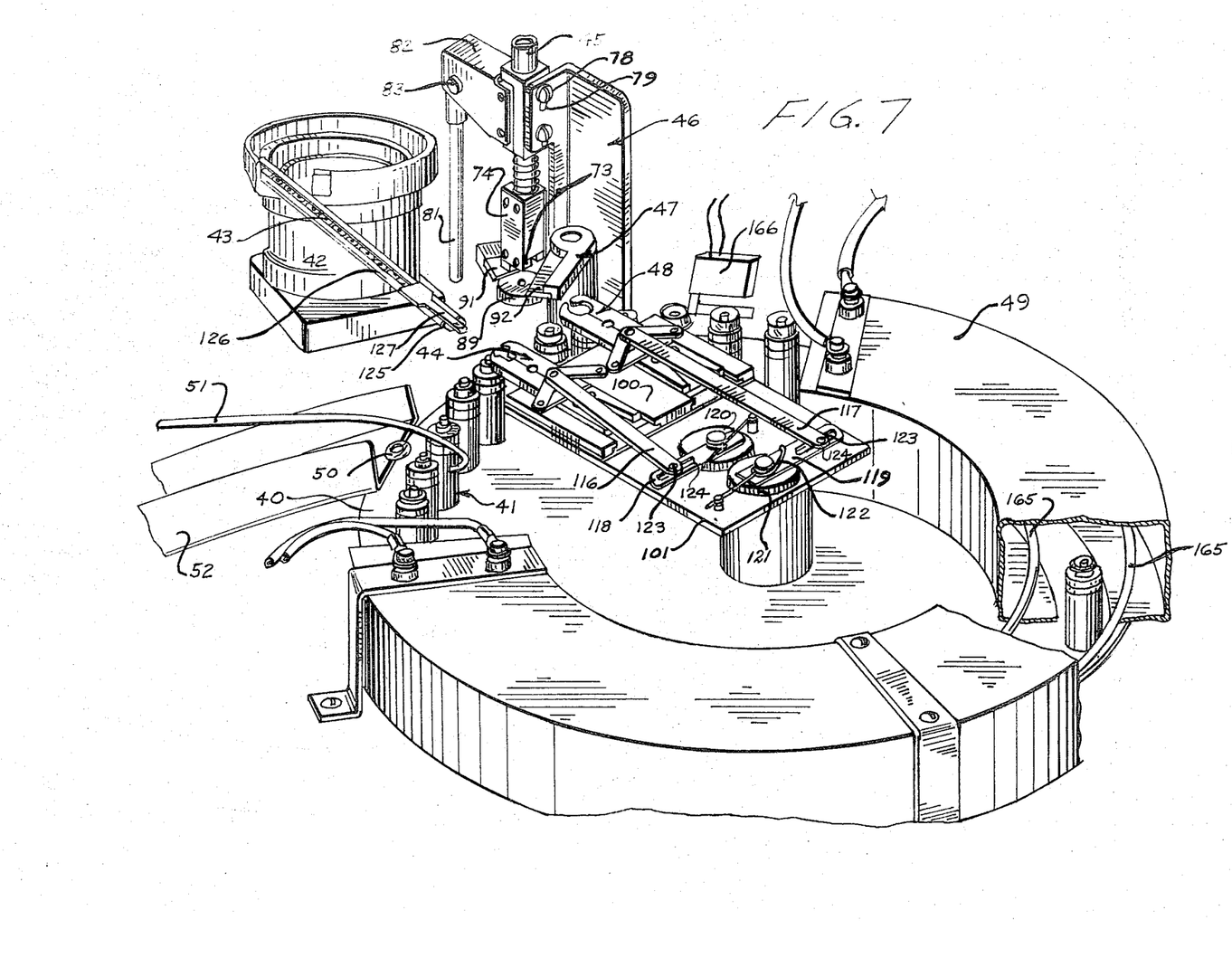
FIG. 7 is a perspective view of one advantageous form of production machine usable in connection with the practice of the method of the invention, for producing lock washers of the types shown in FIGS. 1 – 6.

FIG. 7 illustrates one advantageous form of machine for producing the self-sealing lock washers of the invention. The machine includes a rotary table 40, on which are mounted a large plurality of mandrel stations 41, to be described in more detail. A feeding device 42, which may be of more or less conventional design, is positioned beside the rotary table 40, and arranged to feed lock washers 43, one at a time to the work table. A washer transfer mechanism 44 cooperates with the washer feed 42 to position the individual washers 43 on successive mandrel stations 41 as the rotary table advances in a step-by-step fashion.

Heat-shrinkable tubing 45 is incrementally advanced by means of a feed station 46, cut off by shears 47, and engaged by a transfer mechanism 48, for positioning on successive mandrel stations after placement thereon of a washer.

In FIG. 7, the work table 40 is advancing in a clockwise direction and, after placement of the washer and tubular sealing element thereon, the successive mandrel stations 41 are advanced through a heating tunnel 49, causing the sealing element to be properly heat-shrunk over the washer in the manner desired. As the successive mandrel stations 41 emerge from the downstream end of the heating tunnel 49, the completed sealing washers 50 are ejected by an air jet 51 or similar device and discharged down a chute 52.

Figure 11:
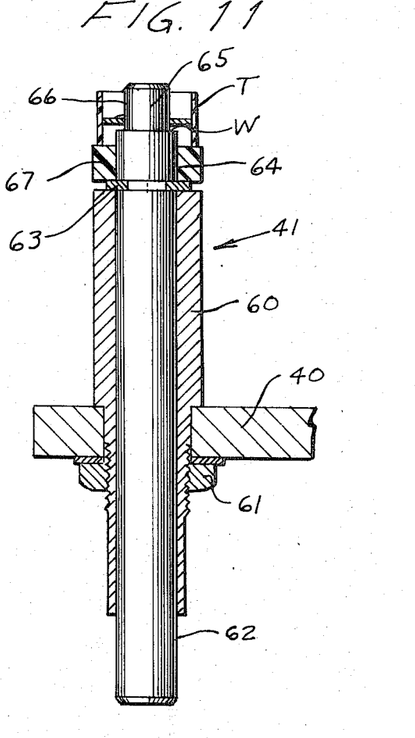
FIG. 11 is a cross sectional view of an assembly mandrel incorporated in the machine of FIG. 7.

Referring now to FIG. 11, the mandrel station 41 includes a bushing 60, which extends through an opening in the work table 40, and is secured in an upright position by means such as a nut 61. A mandrel shaft 62 is slidably received within the bushing for free vertical movement therein to accommodate raising and lowering. Adjacent the upper or head end of the mandrel, a washer 63 forms a shoulder which seats against the upper end of the bushing 60 and determines the lower or working position of the mandrel. The head of the mandrel extends upward from the washer 63 and includes a base portion 64 and a tip portion 65 of smaller diameter, forming an upwardly facing shoulder 66. The diameter of the mandrel tip 65 is such as to be closely received within the center opening of a lock washer W, permitting the washer to be seated on and positioned properly by the upwardly facing shoulders 66. Desirably, the radial width of the shoulder 66 is kept at a minimum width consistent with the need for reliably supporting and positioning the washer W thereon.

A non-metallic bushing 67 is received over the base portion 64 of the mandrel head and seated upon the washer 63. The bushing 67 is of larger diameter than the outside diameter of the washer W and has an upper surface 68 providing a support for a cut length of heat-shrinkable tubing T. The axial length of the bushing is preselected so that the upper surface 68 thereof is spaced from the mandrel shoulder 66 a distance sufficient to cause the tubing section T to be centered with respect to the washer W. The bushing 67 is readily removable and interchangeable to accommodate various sizes and styles of washers W of a given center opening size. The mandrels 62 are likewise interchangeable, and for washers of different size openings and/or unusual configuration, mandrels of appropriate head configuration will be utilized.

In the illustrated machine, the mandrels 62 are arranged to be lifted by cams at appropriate times, to receive a washer W and tubing section T, after which the mandrel returns by gravity to its working position shown in FIG. 11. If desired, a spring or other means (not shown) may be provided to assure more positive return of the mandrel to its working position.

Figure 10:
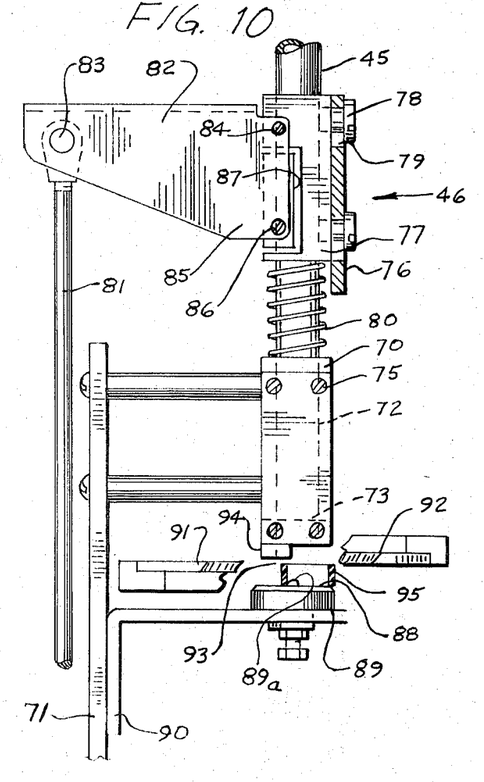
FIG. 10 is an elevational view, with parts broken away, illustrating a portion of the production apparatus of FIG. 7, used for the feeding of sections of heat-shrinkable tubing into position for assembly.

In FIG. 10, there are shown details of an advantageous mechanism for the in-feeding of the heat-shrinkable tubular material 45 used in the forming of the sealing elements. The feeding mechanism, generally designated by the numeral 46, includes a guide block 70, mounted in fixed relation to the machine frame by means of a support 71. The block 70 has a cylindrical passage 72 therein for receiving the incoming tubing, and has a pair of semi-circular jaws 73 (see FIG. 7), mounted at the lower end of the passage 72 by means of spring arms 74 at each side of the guide block 70. The spring arms 74 are secured at their upper ends, as by screws 75, and are arranged to be flexed outwardly at their lower ends, carrying the semi-circular jaws 73.

Mounted above the guide block 70, by means of a fixed plate 76, is a feeder slide 77. The slide 77 is guided for limited vertical movement relative to the plate 76, by means of shouldered screws 78 received in vertically elongated slots 79. A compression spring 80, acting between the guide block 70 and the feeder slide 77, urges the latter upwardly to its limit position. A feed actuator rod 81 is connected to the feeder slide 77, through a lever arm 82 and is arranged, by means to be described, to draw the slide downward against the resistance of the spring 80.

The feed actuator rod 81 is pivotally connected at 83 to the lever 82, and the latter is pivotally connected at 84 to the feeder slide 77. The lower end portion 85 of the lever is pivotally connected at 86 to a clamping shoe 87, which may be generally semi-cylindrical in shape and may be provided with a friction surface on its concave side.

When the feed actuator rod 81 is drawn downwardly through a predetermined stroke, it causes clamping pressure to be applied to the tubing 45, through the clamping shoe 87 and, at the same time, causes the feeding slide 77 to be drawn downwardly. The tubing 45 is thus advanced through the guide block 70 and into contact with the upper surface 88 of a feed anvil 89 mounted for vertical adjustment on the support 71 by means of a bracket 90. As will be understood, the feeding slide 77 has a non-positive frictional gripping relation with the tubing 45, such that the feeding slide may have continued downward movement relative to the walls of the tubing 45, after the tubing has been fed into contact with the anvil surface 88.

Upon completion of the downward feed of the tubing, a pair of shear blades 91, 92 are actuated to close upon the tubing and sever it in the shear plane designated by the numeral 93. The adjusted distance between the anvil surface 88 and the shear plane 93 determines the axial length of the tubing section.

By mechanism to be described, closure of the shear blades 91, 92 is followed by a turn or upward movement of the feeding slide 77 under the urging of the spring 80. The downward force upon an actuator rod 81 having been removed, the gripping force applied to the tubing through the clamping shoe 87 is relieved and the feeding slide is able to move freely upward without carrying the tubing 45 with it. At the same time, the portion of the tubing exposed below the clamping jaws 73 has been squeezed flat by the shear blades, and the intact portion of the tube remains in a flattened configuration by reason of the upper shear blade 92 pressing it against downwardly extending portions 94 of the gripping jaws 73. The spring arms 74 flex outwardly to accommodate the flattening of the lower end of the tubing during the cut-off operation. The flattened configuration of the tubing effectively prevents it from being withdrawn upwardly into the cylindrical guide passage 72 during the upward stroke of the feeding block 77, as will be understood.

Upon completion of the upward stroke of the feed block 77, the shear blades 91, 92 are returned to their open positions. The intact lower end of the tubing is thereupon released by the upper shear blade 92 and is able to return to its generally circular configuration under the urging of the spring arms 74.

Advantageously, a small retaining nib 89a is provided in the central region of the anvil 89, to releasably retain the cut-off section of tubing, designated in FIG. 10 by the numeral 95, in position on the anvil. In this respect, it will be understood that, after the severing has been completed, the cut-off section 95 of tubing will tend to return to its circular configuration, pushing against the lower shear blade 91 and shifting to the right relative to the intact portion of the tubing.

Figure 12:
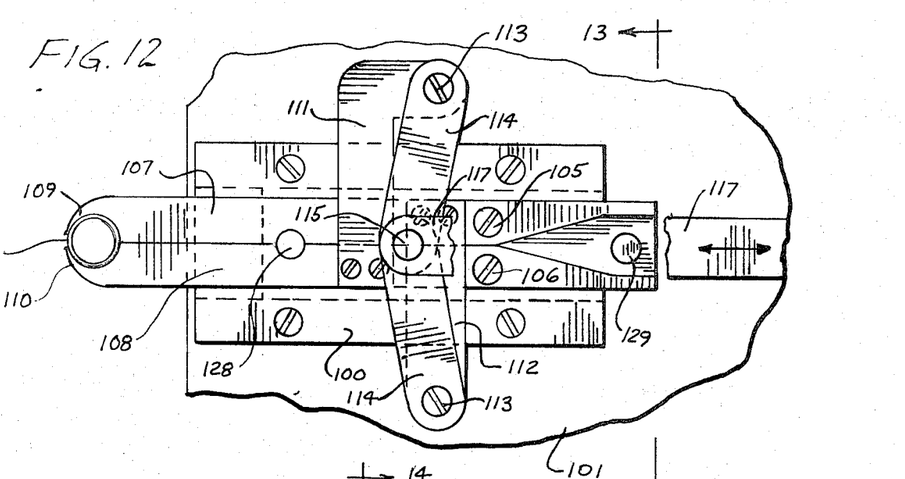
FIGS. 12 and 13 are top plan and end elevational views, respectively, of an advantageous form of parts handling device incorporated in the machine of FIG. 7.
Figure 13:
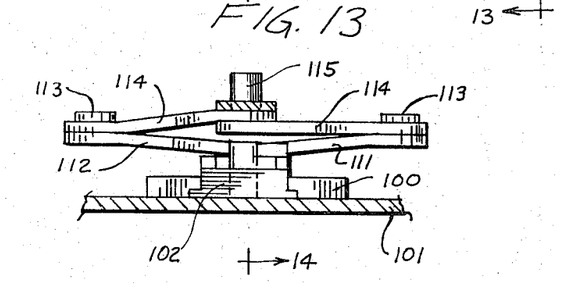
Figure 14:
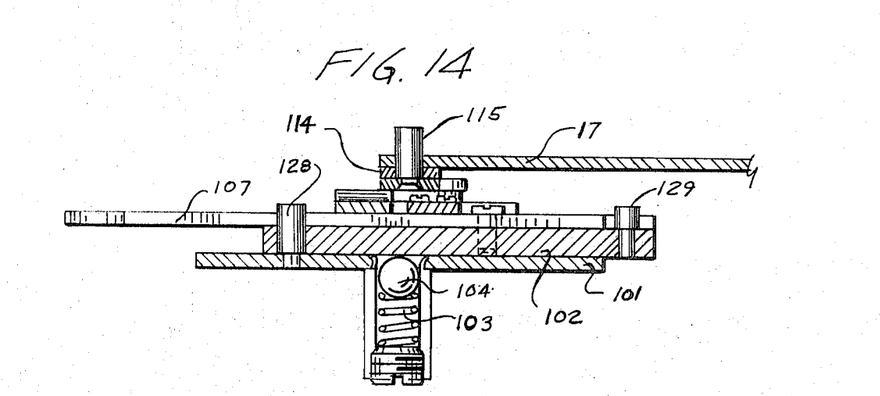
FIG. 14 is a cross sectional view taken generally along line 14—14 of FIG. 12.

With reference to FIGS. 12-14, and also to FIG. 7, simple transfer mechanisms are provided adjacent the washer feeding and tube cut-off stations 42, 46 to effect transfer of washers and tubing sections, respectively, into assembly positions on the mandrel stations 41. Although the transfer mechanism shown in FIGS. 12-14 is specifically configured for handling of tubing sections, it will be understood that the same mechanism, with a slightly different jaw configuration, is appropriate for transferring the lock washers as well.

In FIGS. 12-14, the reference numeral 100 represents a guide plate, which is mounted on a platform 101 (FIG. 7) forming a fixed part of the machine. The guide plate 100 slidably mounts a transfer block 102, which is guided for generally radial movement relative to the work table 40. A compression spring 103 and friction element 104 are mounted in the guide plate 100 to bear against the transfer block 102, so that a predetermined amount of friction accompanies its sliding movement.

Pivotally mounted at 105, 106 on the transfer block 102 are transfer arms 107, 108, movable between closed positions, as illustrated, and open positions enabling jaw portions 109, 110 thereof to be received over a tubing section or lock washer, as the case may be, by movement transversely of the axis thereof.

Connecting arms 111, 112 are rigidly secured to the transfer arms 108, 107, respectively, and are pivotally connected at 113 to actuating links 114. The links 114 are in turn pivotally connected by a drive pin 115.

As reflected in FIG. 7, the drive pins 115 of the respective transfer mechanisms 44, 48 are connected by actuating rods 116, 117 to cranks 118, 119, respectively, carried by gears 120, 121. As will be described in more detail, one of the gears 121 is driven in timed relation to other operations of the machine. Typically, the gears are of the same diameter and are meshed together, so that both are driven through an equal arc of rotation, in opposite directions. Springs 122 act upon the gears 120, 121 to return them to starting positions after actuation.

Desirably, the crank arms 118, 119 are connected to the actuating rods 116, 117 by means of pins 123 received in slots 124, enabling the throw of the rods 116, 117 to be adjusted independently of the rotational angle of the gears 120, 121.

At the desired time in the cycle, the gear 121 is rotated in a counterclockwise direction to effect advancing (radially outward) movement of the actuating rods 116, 117. Due to the frictional restraint acting upon the transfer blocks 102, the movement of the actuator rods is first translated into forward movement of the connecting pins 115 relative to the transfer blocks. This serves to pivot the transfer arms 107, 108, opening the jaws 109, 110 thereof. When the transfer arms have reached their open limit positions, further advancing movement of the rods 116, 117 is necessarily translated into advancing movement of the transfer blocks themselves. The transfer mechanism 44 then advances to a position in which its jaws engage a washer 125 (FIG. 7), exposed at the end of the feeder chute 126 and held lightly therein by spring fingers 127. Likewise, the jaws of the tubing transfer mechanism, after being fully opened, are advanced to a position generally aligned with the cut-off section of tubing retained by the small nib 89a on the anvil 89.

Upon return movement of the actuator rods 116, 117, under the actions of the springs 122, the transfer arms and jaws are first closed, while the transfer blocks are frictionally restrained, and then the transfer blocks are retracted to predetermined positions directly overlying mandrels 62 of a pair of mandrel stations 41. At this stage, the mandrels of the respective work stations are raised and inserted into the washer and tubing section as the case may be, thereupon, in timed relation, the jaws of the transfer mechanisms 44, 47 may be opened by motion of actuating rods 116, 117, to release the washer and tubing sections, and the mandrel 62 during this interval are retracted to their normal working positions.

A pair of alignment dowels 128, 129 are mounted by the transfer block 102 between the transfer arms 107, 108, on opposite sides of the pivot mountings 105, 106.

The alignment dowels engage the transfer arms at the extremities of their opening and closing movements to assure proper alignment of the arms with respect to the transfer axis.

With successive actuating cycles of the transfer mechanism, the work table is indexed in a step-by-step fashion, so that as each mandrel station 41 advances, it has first placed thereon a bare lock washer W and then a section of heat-shrinkable tubing T.

Figure 8:
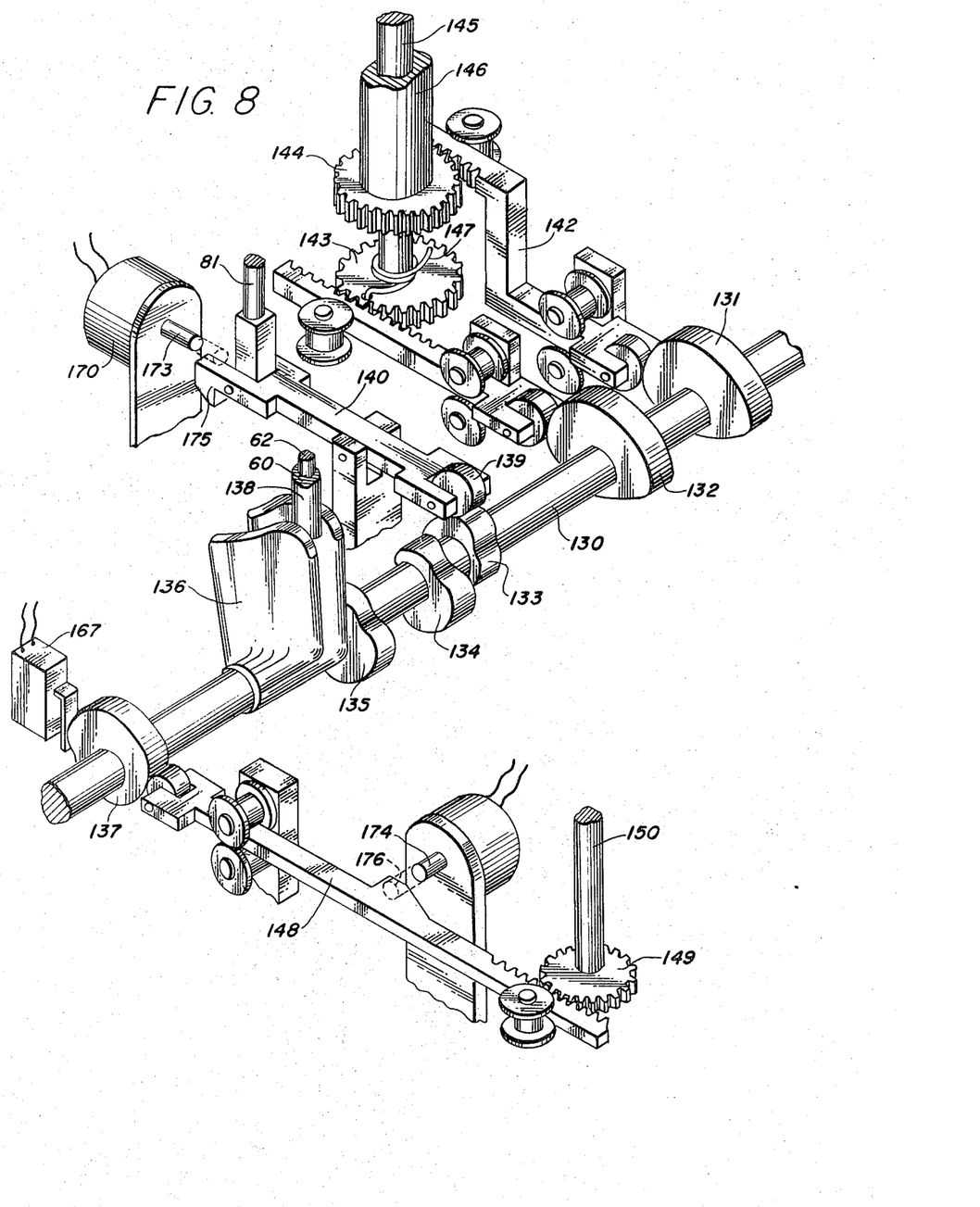
FIG. 8 is a simplified perspective representation of a typical actuating mechanism for the equipment of FIG. 7.

With reference now to FIG. 8, the driving and timing mechanism of the illustrated machine is shown to include a main drive shaft 130 carrying a plurality of timing cams 131–137. The shaft 130 is driven by a suitable motor (not shown) which may be capable of speed adjustment. Cam 136 is positioned to engage the lower end 138 of a mandrel bushing 60 to effect indexing movement of the bushing and therefore of the work table. The displacement of the cam 136 is such that, during each revolution thereof, the work table is indexed one position, and the indexing cam 136 engages and advances successive bushings on the table during successive operating cycles. Appropriate detent means (not shown) serve to hold the table in position between indexing operations.

During the indexing phase of the cycle, the tube feeding and cut-off mechanisms are actuated in sequence. To this end, a cam 133 operates to raise the cam follower 139 associated with a pivoted lever 140. The lever 140 is connected to the actuating rod 81, such that upward displacement of the cam follower 139 causes the rod 81 to the drawn downward, effecting incremental feeding of the tubing supply 45 in the manner heretofore described. Upon completion of this downward stroke of the rod 81 and while the rod is being held in such downward position by a dwell portion of the cam 133, cutter actuating cams 131, 132 function to effect displacement of rack arms 141, 142 and opposite rotation of associated pinions 143, 144. Through a shaft 145 and sleeve 146 the cutter blades 91, 92 are actuated to close, against the action of coil spring 147.

While the cutters remain in their closed positions, by reason of dwell surfaces on the cutter cams 131, 132, the actuating rod 81 is released by the cam 133, permitting retraction of the tube feeding slide 77 while retaining the tubing itself effectively locked in position through the flattening thereof by the still-closed cutter blades.

After completion of the indexing, tube feeding and tube cutting operations, continued rotation of the drive shaft 130 causes the transfer cam 137 to effect diaplacement of a rack bar 148. This causes rotation of a pinion 149 and shaft 150, connected to the transfer gear 120, to effect actuation of the respective transfer mechanisms 44, 46 in the manner heretofore described.

Upon return of the loaded transfer mechanisms to their unload positions, mandrel elements 62, located at the transfer stations, are caused to be lifted to their elevated transfer positions by lifting cams 134, 135. These cams are timed to raise the mandrels after the loaded transfer mechanisms have been retracted and to lower the mandrels upon subsequent opening of the transfer amrs.

Figure 9:
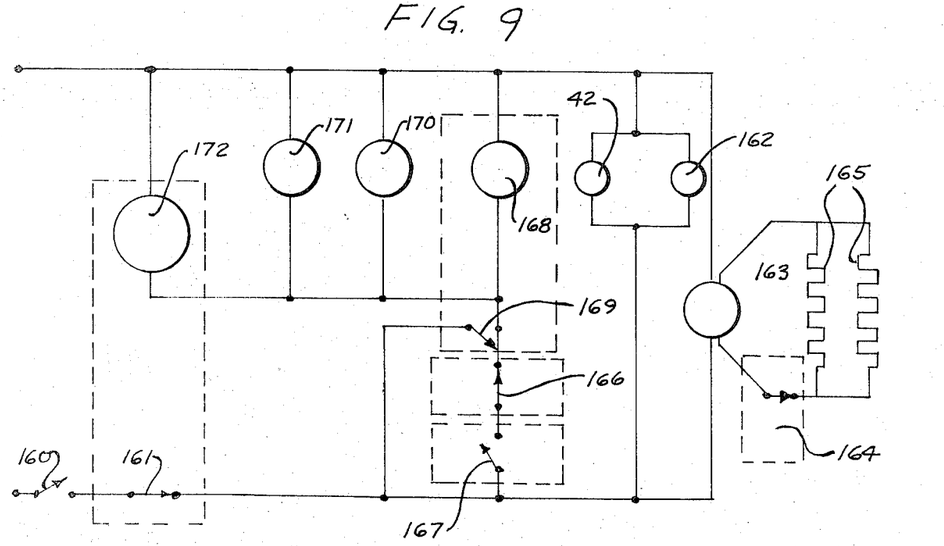
FIG. 9 is a simplified representation of a control system usable with the apparatus of FIGS. 7 and 8.

As will be understood, the timing of the operation of the illustrated machine is principally mechanical in nature. Nevertheless, certain controls and safety interlocks may be provided, as reflected in FIG. 9. When the system is in normal operation, a main switch 160 supplies power through normally closed timer contacts 161 to the main drive motor 162 and to the washer feeder 42. Power is also supplied through a transformer 163 and temperature control 164 to heaters 165 located within the heating tunnel 49. The presence of an assembled washer and tubing section at each mandrel station of the constantly indexing work table is sensed by a detector switch 166 (FIG. 7), the normally closed contact of which are constantly held open by successive filled mandrel stations. During each cycle of operations a cam actuated switch 167 (FIG. 8) is momentarily closed by one of the cams (in this instance cam 137). So long as the switch 166 remains open, nothing is initiated by the cyclically closing switch 167. However, if a switch 166 senses the absence of a washer or tubing section, and thereby closes, the momentary closing of the cam switch 167 will energize a relay 168 momentarily. The relay 168 is self-holding through a set of its own normally open contacts 169 so that it remains energized after momentary closing of the switches 166, 167.

Simultaneously with the energizing of the relay 168, solenoids 170, 171 are energized, along with a timer motor 172. As reflected in FIG. 8, energization of the solenoids 170, 171 results in extension of their respective armature rods 173, 174. Upon the next downward feeding stroke of the tube feed actuating rod 81, the armature rod 173 will be momentarily displaced by a locking cam 175 and then brought into locking position above the cam to prevent return movement of the actuator rod 81. This disables the tube feeding system, even though the main drive shaft 130 continues to rotate. Likewise, the armature rod 174 is displaced by a locking cam 176 carried by the transfer rack bar 148 and, after the rack bar has been moved to its extended position, it is locked against return movement, thereby disabling the transfer mechanism.

Operation of the drive motor 162, and further indexing movement of work table 40 is continued after disablement of the feeding systems in order to advance all stations throughout the entire extent of the heating tunnel 49. This is accomplished by setting of the timer motor 172, which eventually opens its contacts 161 and shuts down the entire system.

During start-up when there are no parts on the mandrels passing the detector switch 166, the switch may be held open manually or by means of a suitable timed bypass circuit.

As will be apparent, the self-sealing washer of the invention has unique advantages in that, not only are its sealing properties of superior nature, but the unit is readily adaptable to automated production. This property is, of course, a critically important consideration, because an excessive premium cost would render the product unattractive on the commercial market, regardless of its superior functional characteristics. The new self-sealing washer is unique in that it includes an element of sealing material which is heat-shrunk over the periphery of a radial tooth lock washer, to provide uniquely effective sealing underneath the screwhead or nut.

As is readily apparent in FIGS. 1–6, the principles of the invention are adaptable to both external and internal tooth lock washers, and to counter sunk washers as well as flat washers. Moreover, the applicability of the invention is by no means limited to the specific examples illustrated.

One of the important markets for radial tooth lock washers is in the production of screws and nuts with attached, captive washers. Typically, these are produced by assembly of the washer and an associated screw or nut, followed by a forming operation on the screw or nut which leaves the washer trapped in operative association therewith. As will be easily appreciated, the self-sealing lock washer of the invention is readily adaptable to such production procedures.

One of the advantages to be derived of the new self-sealing washer results from the superior protection afforded to the male and female threads of the fasteners associated with the washer. Particularly where the fasteners have to be removed from time to time for servicing or the like, there normally is a need for fasteners of higher quality (and cost) to avoid thread deterioration. Using the device of the invention, the service or similar requirements may be fully satisfied with fasteners of lower quality, possibly achieving savings in fastener costs in excess of the premium cost of the washer.

It should be understood, of course, that the specific forms of the invention illustrated herein, and the illustrated equipment and manufacturing procedures for its production, are intended to be illustrative only, as certain alterations may be made therein without departing from the clear teachings of the disclosure. Accordingly, reference should be made to the following appended claims in determining the full scope of the invention.

I claim:

1. The method of making a self-sealing radial tooth lock washer, which comprises
    a. supplying a radial tooth lock washer having teeth thereon being twisted to extend beyond opposed axial end faces of the washer,
    b. positioning over said washer in generally concentric relation thereto a tubular section of heat-shrinkable elastomeric material,
    c. positioning said tubular section with its axial ends projecting substantially axially beyond the principal surfaces of said washer formed by its axial end faces, and.
    d. subjecting said washer to heat thereby constricting the tubular section by effecting radial shrinkage thereof, whereby portions of said tubular section intermediate its ends are brought into tightly constricted radially compressing relation to the outer peripheral edges of the washer,
    e. and constricting the radially shrunk tubular section end portions during the heating, thereby causing said end portions to overly in juxtaposition the opposed axial faces of the washer.

2. The method of claim 1, further characterized by
    a. said heat-shrinkable material comprising a heat-shrinkable elastomer, and
    b. said elastomer is exposed to said heat while being held in predetermined concentric relation to said washer.

3. The method of claim 2, further characterized by
    a. said tubular section having been radially expanded to have a ratio of expanded diameter-to-recovered diameter of at least about 2 to 1, and
    b. said tubular section having an expanded internal diameter not substantially greater than the external diameter of said washer.

* * * * *